Oct. 20, 1959 W. A. BARNES ET AL 2,909,086
MACHINE AND DIE CONTROL APPARATUS FOR
APPLYING COLD WELDING PRESSURES
Filed May 28, 1957 4 Sheets-Sheet 2

INVENTORS
WILLIAM A. BARNES
BY STANLEY A. ZYSK
Pyle & Fisher
ATTORNEYS

Oct. 20, 1959 W. A. BARNES ET AL 2,909,086
MACHINE AND DIE CONTROL APPARATUS FOR
APPLYING COLD WELDING PRESSURES
Filed May 28, 1957 4 Sheets-Sheet 3
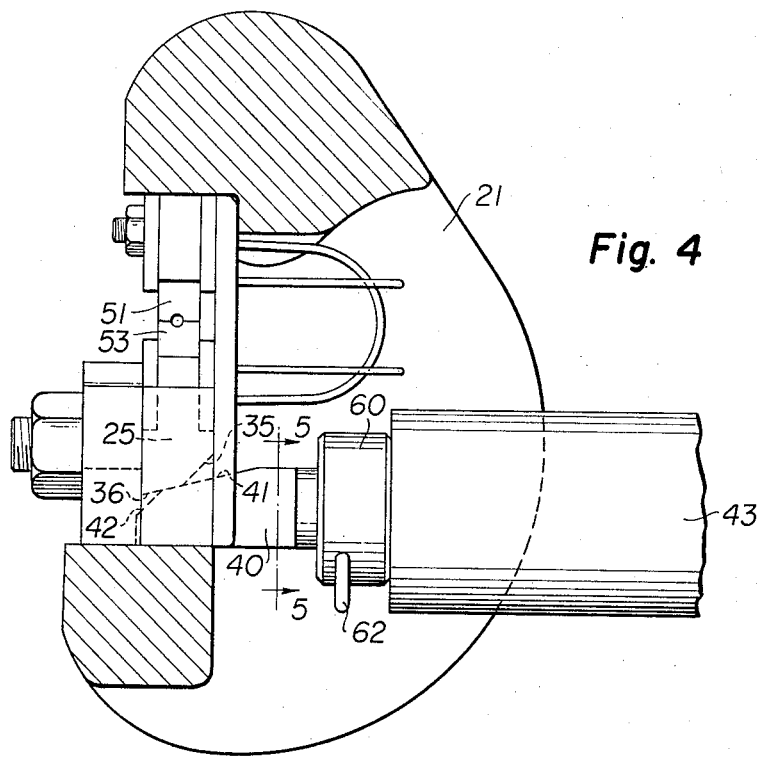
Fig. 4
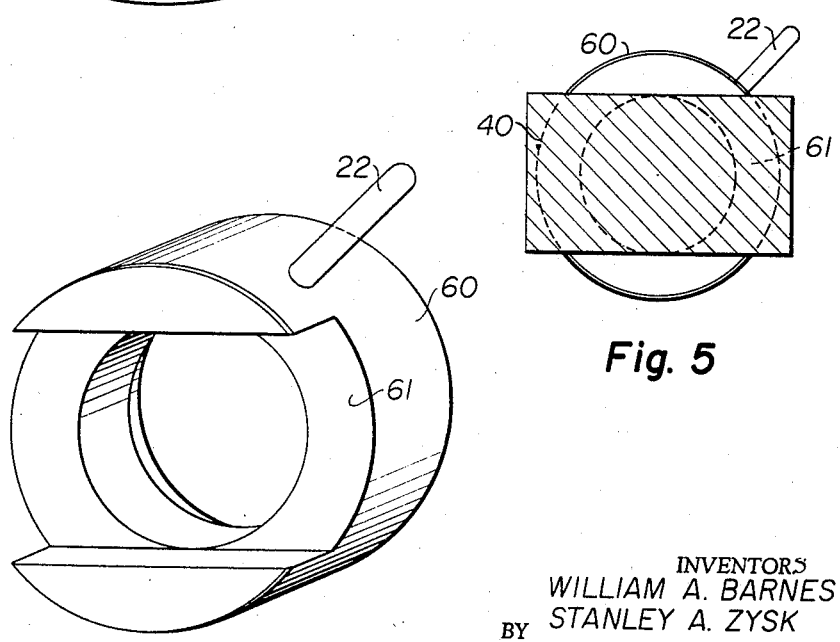
Fig. 5
Fig. 6
INVENTORS
WILLIAM A. BARNES
BY STANLEY A. ZYSK
Pyle & Fisher
ATTORNEYS

INVENTORS
WILLIAM A. BARNES
BY STANLEY A. ZYSK

*Pyle & Fisher*
ATTORNEYS

United States Patent Office 2,909,086
Patented Oct. 20, 1959

2,909,086

MACHINE AND DIE CONTROL APPARATUS FOR APPLYING COLD WELDING PRESSURES

William A. Barnes, Utica, and Stanley A. Zysk, Little Falls, N.Y., assignors to Kelsey-Hayes Company, Utica Drop Forge and Tool Division, a corporation of Delaware Application May 28, 1957, Serial No. 662,291

2 Claims. (Cl. 78—82)

This invention relates in general to tools having relatively closable die carriages, such as presses, and relates more specifically to a changeable die press particularly adapted to grip and force two workpieces together with a steady closing force to produce a weld between the workpieces by pressure alone at a temperature less than the heat weld temperature for the workpieces.

There are known devices which employ a sloping support surface on carriages which hold sloping surface work members such as dies. One example is a sheet metal shrinking machine, United States Patent Number 2,357,-204. As the carriage presses the die members against a resistant surface, the dies are urged together by resolved forces acting between the sloping carriage and die surfaces. This basic concept is carried out in other tools for performing work functions of various types.

This invention finds particular adaption in the provision of actuating mechanism to operate such a carriage or carriages, particularly as applied to opposed split die sections which close upon a workpiece and then close with respect to one another. According to this invention a cam and cam follower relationship is established between a carriage and a reciprocable power source. The cam relationship is such that a first extent of reciprocal movement of the power source will produce normal carriage movement, and a second extent of power source travel will produce a further opening of the carriage in order to provide for die changing. It is inefficient to close press members through long ranges of travel and accordingly a fast initial closing followed by a slower power closing movement is generally provided.

The principal object of this invention is to provide a closable jaw work performing machine with a die carriage operable through a work range of reciprocation, and having an open position beyond the work range for die changing.

Another object of this invention is to provide pressure dies, with die controls, having sections side by side movable to and from one another with cam surfaces and sliding engagement with surfaces of the supporting member.

Another and more specific object of this invention is to provide a closable jaw work performing machine wherein the closing action is provided through a mated cam couple having a first fast taper surface relationship and a second slow taper work surface relationship to thereby provide either a regular work range or a wide opening range for die changing.

Still another object of this invention is to provide a power drive ram to operate the mated cam couple, with the provision of a unique extendible power connection between the couple and the ram determining the work range.

This application is a continuation-in-part of William A. Barnes application Serial Number 481,596 filed January 13, 1955 and entitled Apparatus for Butt Welding, now Patent No. 2,863,344 issued December 9, 1958.

Other objects and a fuller understanding of the invention may be had by referring to the following description and claims, taken in conjunction with the accompanying drawings, in which:

Figure 4 illustrates the maximum actuation position of the actuating ram, with the dies closed and ready to retract;

Figure 5 is a section taken along 5—5 of Figure 4;

Figure 6 is a perspective view of a control collar employed to limit the actuating ram in extent of rearward travel;

Figure 1:
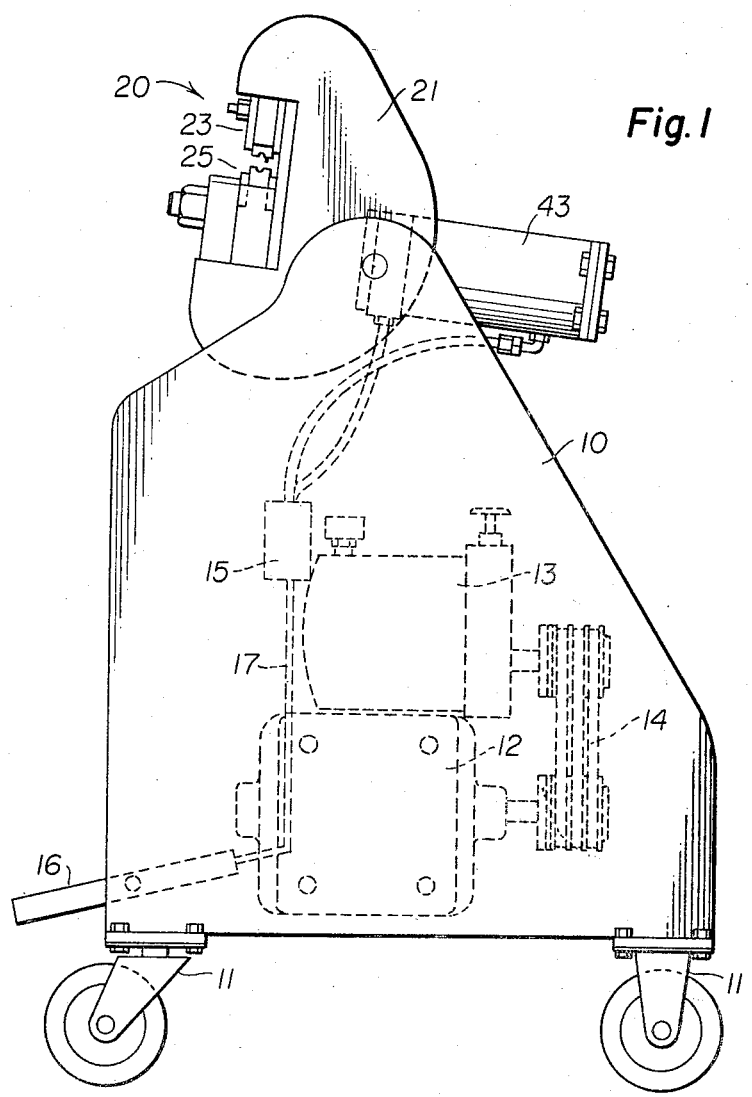
Figure 1 is a side view of a floor model tool embodying the features of this invention, with the location of major associated operating components indicated in dotted outline.

The double range actuation features of this invention may very well be carried out in a variety of press type environments, but the drawings illustrate a very successful portable floor model embodying the features and advantages of the present invention. This model is carried and operated by mechanism contained within a tote housing 10 made portable by casters 11.

A fluid power system is housed within the tote housing 10. A motor 12 and hydraulic pump 13 are drawn in dotted outline. A belt system 14 interconnects the two for power transmission. A four-way valve 15 is controlled by the operator of the device through a foot treadle 16 operating a control link 17.

The improved operating portion of the illustrated embodiment is carried in a head assembly 20. The assembly 20 is essentially a small press embodied in a C-frame 21.

Figure 3:
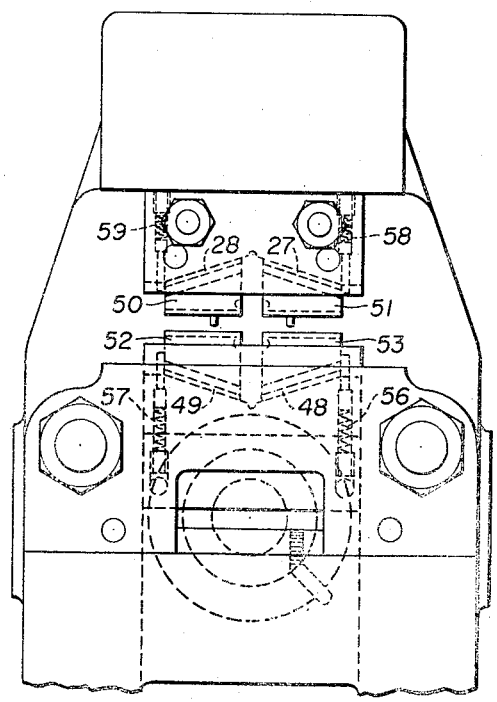
Figure 3 is a front view of the operating head.

This particular embodiment of the invention has been developed principally for the cold pressure welding of metals. It has been found that some metals, aluminum and copper in particular, can be united with an exceptionally strong weld without the use of heat or foreign substances. Such welding is accomplished by gripping the two workpieces tightly and forcing them together under strictly controlled conditions. These conditions are now fully disclosed and well understood by metallurgists skilled in this art, in both literature and issued patents. The drawings illustrate a stationary die carriage 23 carried at the upper mouth portion of the C-shaped frame 21. This die carriage 23 is preferably a composite structure embodying a center block 24 sandwiched between side rails 29 and held in the illustrated position by a clamping bolt 31. Figure 3 best illustrates inwardly sloping slide surfaces 27, 28 in an inverted V relationship. In the illustrated embodiment, the inwardly sloping slide surfaces 27 and 28 are utilized as closing cams upon which die-halves 50 and 51 may ride. It will be seen that an upward force on dies 50 and 51 will cause a closing cam action forcing these die halves toward one another. Side rails 29, in conjunction with the center block 24, provide a guide slot to direct the dies 50 and 51 in movement toward and away from one another.

A bottom die carriage 25 is composed of a center block 26 with side rails 30. The lower die carriage 25 is vertically reciprocable and is held in confinement in a vertically reciprocable path by means of a clamp plate 33 held in place by a bolt and nut assembly 32. A conventional collar device holds the clamp plate 33 snug without binding the carriage 25.

Sloping surfaces 48 and 49, like the surfaces 27 and 28, are in a V relationship and provide inwardly sloping slide surfaces which act as closing cams. Die halves 52 and 53 are designed to ride these surfaces and close with respect to one another under vertical forces. Consequently, when the die carriage 25 is actuated upwardly, the die halves 52 and 50 close together to grip a workpiece, and the die halves 51 and 53 close together to grip another workpiece. When the forces between the dies upon the workpieces are greater than resistance to sliding of the mated split dies, then the workpieces are moved toward one another by the combined closing action of the die halves.

In the illustrated embodiment of this invention, hairpin springs 54 and 55 are provided to urge the die halves into the open die condition as illustrated in Figure 3. The resistance to closing provided by the springs 54 and 55 and any other resistance to closing which may be provided will determine the clamping force of the split dies on a workpiece.

The clamping force holding the die halves separated and the clamping force resisting closing the mated split dies has a large effect upon the resultant weld. By using strong springs 54 and 55 the clamping force between the split dies will be greater before the dies begin to move the workpieces toward one another.

In the uniting of workpieces, such for example as wire, by cold pressure butt welding, the workpieces are held by dies and forced tightly against one another in such a manner that the workpieces are caused to flow laterally in surface contact under extreme pressure and under confinement. The principles of cold welding have been well developed. One of the principles which has evolved is that the amount of material available to flow during the welding process is very critical. Too much material will prevent complete closing of the dies and too little will prevent complete filling of the die cavity. Either event will produce less than satisfactory results.

Prior to this invention the control of the amount of material between the two mated split dies has been achieved by preparing and trimming the workpiece with respect to the face of the die after the workpiece has been clamped in the die. It has been discovered that two dies can be placed in the machine of this invention with the die faces spaced a precise distance with respect to one another. Workpieces may then be positioned in the dies and with the ends thereby welded in touching relationship. Then, after the dies are properly spaced originally, the amount of material within the dies will be within acceptable range limitation permitting a uniform weld.

Figure 8:
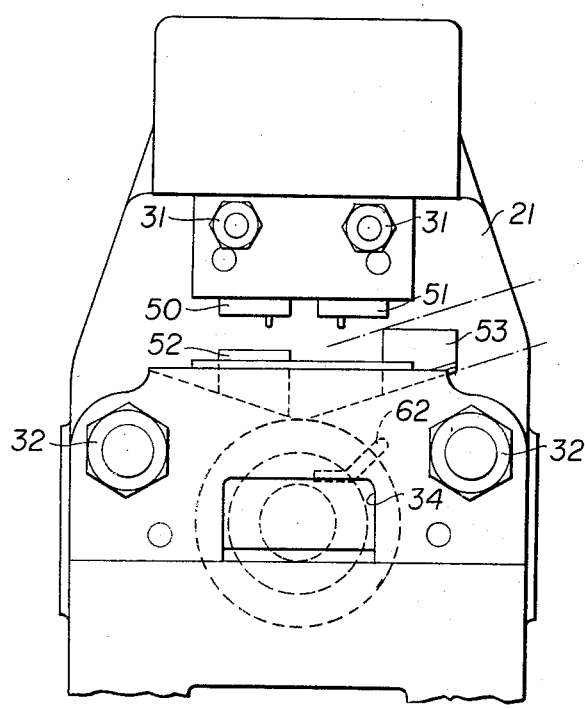

Because the amount of material between the dies will vary according to the size and shape of a particular workpiece, the spacing between dies for various workpiece sizes will be different. The solution to this problem has been use of stop pins 56, 57, 58 and 59, as best indicated in Figure 3. Without description in detail, it will readily be seen that these pins are positioned to project across the path of reciprocation of each of the die halves and are retractable by pressure in order to slip the die past the particular retaining pin. Accordingly, precise calculation can be carried out and the dies made to the proper length for each workpiece in order to have a space between the two halves of proper distance to provide the necessary weld metal. Removal of the dies, as suggested in Figure 8, is readily accomplished by forcibly retracting the pin members into the sockets.

The unique feature provided by this invention is the ability of the device to bring the carriages together for normal work operations, and to selectively move the carriage to an extreme open position for die change when necessary. Reference to the Figure 3 will readily reveal that the die halves could not be removed from the guided slots in which they rest, even though they might be released from their holding means. There is no room for any die to move out of the press in this illustrated position. Reference to Figure 8 will indicate a lowered position of the carriage 25 and in Figure 8 the die 53 is shown partly removed from the press. Dotted lines indicate the clearance required by this die 53 for removal, and it will be seen that there is sufficient clearance in the Figure 8 position.

Referring to the Figure 4, the die carriage 25 is provided with a first cam follower surface 35 and a second cam follower surface 36. The surface 35 is at a smaller angle to the vertical direction of movement for the carriage 25 than is the surface 36.

Figure 2:
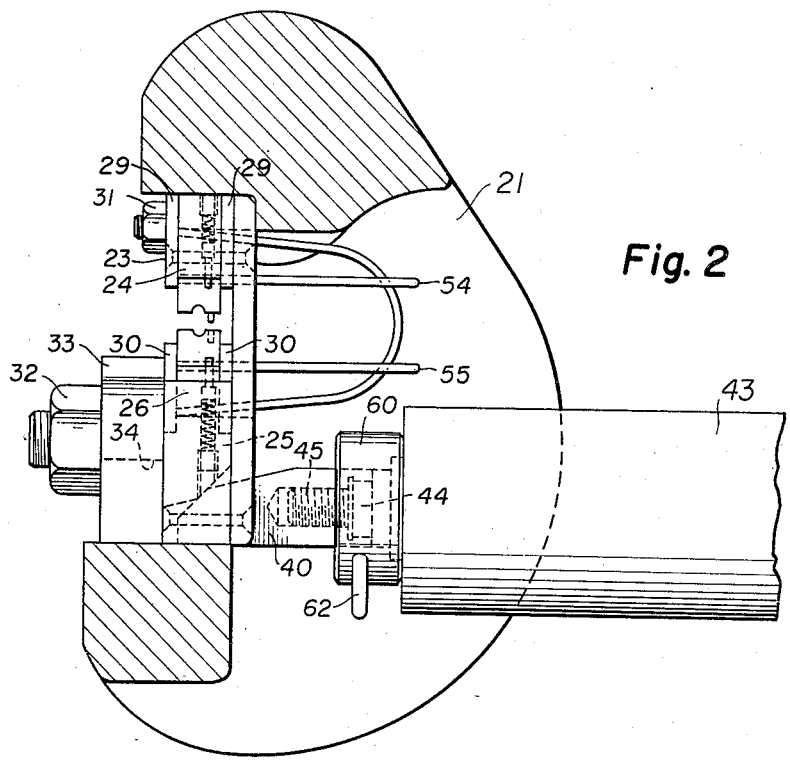
Figure 2 is a side view of the operating head, enlarged in comparison with Figure 1, illustrating in greater detail the relationship of the die carriages with the actuating ram, as at the rest position at the end or beginning of the work cycle.

A ram 40 is provided with camming surfaces to cooperate with those described on the carriage 25. A long taper 41 over the greater part of ram 40 is the principal work cam, whereas a forward nose cam 42 is a surface at a sharper angle corresponding somewhat to the angle of surface 35. Accordingly, the Figures 2 and 4 indicate the extreme positions for the normal work cycle of the illustrated tool. In Figure 2, the cam follower surface 35 and the second cam surface 42 at the nose of the ram are in contact, but only over a portion of their mutual extent. A slight forward movement of ram 40 causes an immediate fast upward movement of carriage 25 through a short distance, followed by a slower and more powerful closing action upon the engagement of surface 41 with the cam follower surface 36. Such relationship is illustrated in Figure 4. In Figure 4, the ram 40 has advanced until the dies have been mated and closed. Forward movement of the ram 40 from this position will produce an extreme pressure clamping condition. An opening 34 in the plate 33 permits the ram 40 to move outwardly as far as die conditions will permit.

Figure 7:
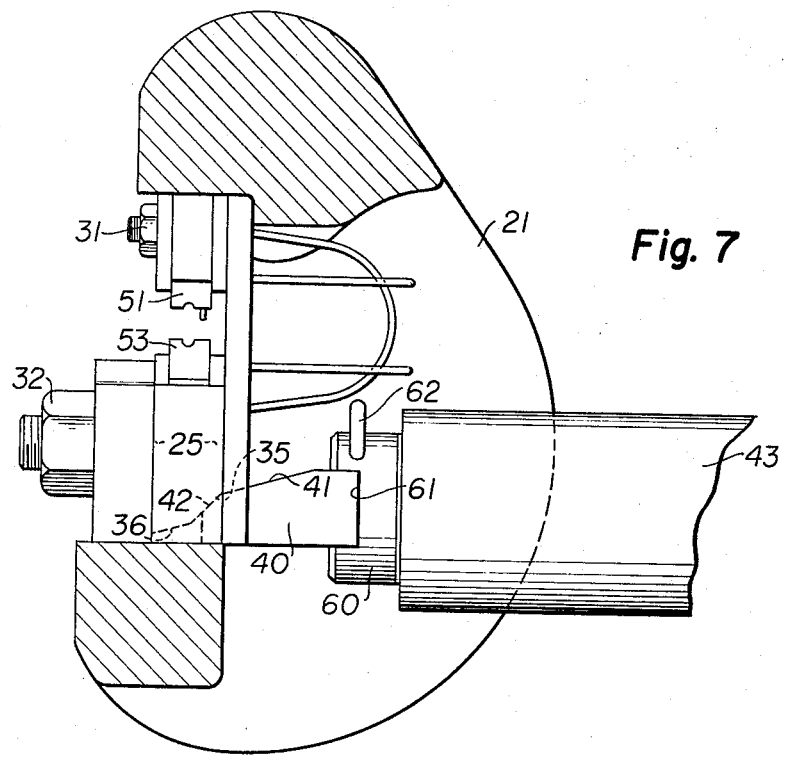
Figure 7 illustrates the ram and die carriage relationship brought about by telescoping the collar of Figure 6 upon the actuating ram; and, Figure 8 is a front view of the die changing condition as illustrated in Figure 7.

According to this invention, a further retraction of the ram 40 from the position shown in Figure 2 is provided in order to produce the die removal condition as described in connection with Figure 8. Such further retraction is illustrated in Figure 7.

The control of the advance and retraction of ram 40 is unique in this invention. Power to drive the ram 40 through a reciprocable path is provided by hydraulic cylinder 43. The cylinder 43 has a piston rod 44 which is threadedly engaged with a threaded socket 45 of the ram 40, as best shown in Figure 2. The hydraulic cylinder and ram is conventional in most respects and has an inherent limit of advance and retract movement. The advance movement will be limited by the amount allowable by the closing of the dies and performance of the work. Retraction would normally be limited by the physical construction of the cylinder. However, a restriction upon the retractability of the cylinder 43 is provided in order to carry out the unique control of this invention.

Figure 5 is the cross sectional view of the ram 40. It will be seen from this view that the ram is generally rectangular in cross sectional configuration. A collar 60 is carried around the rod 44. The collar 60 is provided with a transverse slot 61. A handle 22 is provided to manually rotate the collar 60 between a position wherein the slot 61 extends transversely of the ram 40, as in Figures 7 and 8, and vertically of the ram 40, as in all other views. By this means, a change from the limited work range of reciprocation to an extended range of reciprocation is accomplished with striking ease. This unique and fool-proof design makes possible a quite simple control of movement for die carriage 25. When the collar 60 is oriented to provide the slot 61 in the vertical condition, it will be observed that the rear portion of the ram 40 will abut the extreme forward surfaces of the collar 60. Whenever the slot 61 is oriented in a horizontal direction the rear portion of ram 40 will telescope into the slot 61 and retract a greater distance, as shown in Figures 7 and 8.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

We claim:

1. In a press, a cam, a cam actuated die carriage, a prime mover operably connected to the cam, and cam stop means carried by the press to interact with the cam, the cam being movable in one direction to move the die carriage for work performance and in the other direction for retraction of the die carriage, the stop means having a first position in which it registers with the cam to limit the said retraction movement to a work performance range, the stop means being selectively positionable to a second position, said stop means being ineffective to limit the said retraction movement to said work performance range when in said second position, said die carriage thereby having a first work range determined by reciprocation of the prime mover limited by the stop means in said first position, and a second range of greater extent determined by the stop means in said second position.

2. A wedge press, comprising in combination, a reciprocating press plunger, a reciprocating wedge having a cam surface engaging said plunger for moving the latter longitudinally, said wedge having a fast taper end portion, a slow taper work portion, a hydraulic cylinder with a drive ram extendible and retractable between first and second limits, said drive ram operatively connected to drive said wedge, said hydraulic cylinder having a drive stroke of a magnitude moving said wedge with respect to said cam surface throughout the full length thereof, a removable collar carried by said drive ram, and interference stop surface means positioned to be contacted by said collar when carried by said ram, said collar being positioned on said ram with respect to said stop means to prevent drive movement of the wedge to a position wherein the fast taper portion of the wedge is engaged with the plunger, whereby the collar may be removed only whenever the extra distance movement of the plunger is necessary.

References Cited in the file of this patent

UNITED STATES PATENTS

| | | |
|---|---|---|
| 363,041 | Baker et al. | May 17, 1887 |
| 480,228 | Berry | Aug. 2, 1892 |
| 681,873 | Carney et al. | Sept. 3, 1901 |
| 1,531,491 | Macready et al. | Mar. 31, 1925 |
| 1,999,057 | Peterson | Apr. 23, 1935 |
| 2,357,204 | Joyner | Aug. 29, 1944 |
| 2,465,734 | Lewin | Mar. 29, 1949 |
| 2,774,262 | Sowter | Dec. 18, 1956 |
| 2,786,364 | Sawyer | Mar. 26, 1957 |
| 2,817,254 | Barnes | Dec. 24, 1957 |